(12) United States Patent
Chanas et al.

(10) Patent No.: US 7,346,221 B2
(45) Date of Patent: Mar. 18, 2008

(54) METHOD AND SYSTEM FOR PRODUCING FORMATTED DATA RELATED TO DEFECTS OF AT LEAST AN APPLIANCE OF A SET, IN PARTICULAR, RELATED TO BLURRING

(75) Inventors: Laurent Chanas, Houilles (FR); Frederic Guichard, Paris (FR); Lionel Moisan, Paris (FR); Bruno Liege, Boulogne (FR)

(73) Assignee: DO Labs, Boulogne (FR)

( * ) Notice: Subject to any disclaimer, the term of this patent is extended or adjusted under 35 U.S.C. 154(b) by 400 days.

(21) Appl. No.: 10/483,495

(22) PCT Filed: Jun. 5, 2002

(86) PCT No.: PCT/FR02/01915

§ 371 (c)(1),
(2), (4) Date: May 28, 2004

(87) PCT Pub. No.: WO03/007242

PCT Pub. Date: Jan. 23, 2003

(65) Prior Publication Data

US 2004/0218803 A1    Nov. 4, 2004

(30) Foreign Application Priority Data

Jul. 12, 2001 (FR) .................... 01 09291
Jul. 12, 2001 (FR) .................... 01 09292

(51) Int. Cl.
*G06K 9/40* (2006.01)
(52) U.S. Cl. .................. 382/255; 382/254; 358/1.6
(58) Field of Classification Search ............... 382/254, 382/255; 348/224.1, 241, 211.9, 364, 473, 348/247; 358/1.6; 396/91
See application file for complete search history.

(56) References Cited

U.S. PATENT DOCUMENTS 5,091,773 A * 2/1992 Fouche et al. ............. 348/806
5,251,271 A   10/1993 Fling (Continued)

FOREIGN PATENT DOCUMENTS

EP    0 867 690    9/1998

(Continued)

OTHER PUBLICATIONS

Wallner, Dawn, "Building ICC Profiles—the Mechanics and Engineering", Apr. 2000, http://www.color.org.*

(Continued)

*Primary Examiner*—Samir Ahmed
*Assistant Examiner*—Eric Rush
(74) *Attorney, Agent, or Firm*—Oblon, Spivak, McClelland, Maier & Neustadt, P.C.

(57) ABSTRACT

A system and method for producing formatted information related to at least one image-capture appliance and/or at least one image-restitution appliance. The system and method provide for production of formatted information related to defects of the appliance, especially blurring and noise, from a measured field. This measured field is obtained from a universal set by performing the operations: capturing or restituting the universal set by the appliance to produce an image; choosing an image zone within the image; calculating a reference image from the image; selecting, within the reference image, a reference zone homologous to the image zone; choosing a base for representing all or part of the image zones and reference zones; selecting variable characteristics of the appliance; and in this way the measured field is obtained. The system and method are applicable to photographic or video image processing, in optical devices, industrial controls, robotics, metrology, etc.

41 Claims, 6 Drawing Sheets

U.S. PATENT DOCUMENTS

| | | | |
|---|---|---|---|
| 5,353,392 | A | 10/1994 | Luquet et al. |
| 6,809,837 | B1 * | 10/2004 | Mestha et al. ............... 358/1.9 |
| 6,956,966 | B2 * | 10/2005 | Steinberg ................... 382/167 |
| 2003/0016865 | A1 * | 1/2003 | Lopez et al. ................ 382/165 |

FOREIGN PATENT DOCUMENTS

| | | |
|---|---|---|
| EP | 1 104 175 | 5/2001 |
| JP | 2000-137806 | 6/2000 |
| WO | 01/35052 | 5/2001 |

OTHER PUBLICATIONS

Watanabe, Mikio, "An Image Data File Format for Digital Still Camera", Final Program and Advance Printing of Papers, Annual Conference, Imaging on the Information Superhighway, pp. 421-424, 1995.*

Mikio Watanabe, et al., "An image data file format for digital still camera", Final Program and Advance Printing of Papers. Annual Conference, Imaging on the Information Superhighway, pp. 421-424, XP000618775 1995.

NISO: "NISO draft standard. Data dictionary-technical metadata for digital still images-working draft, 1.0", XP002224028, pp. 1-40 Jul. 5, 2000.

Japan Electronic Industry Development Association: "Digital still camera image file format stanard (exchangeable image file format for digital still cameras: exit) version 2.1" pp. 1-166, XP002224029 Jun. 12, 1998.

U.S. Appl. No. 10/482,413, filed Jan. 12, 2004, Liege et al.

U.S. Appl. No. 10/483,253, filed Jan. 12, 2004, Chauville et al.

U.S. Appl. No. 10/482,419, filed Jan. 12, 2004, Chauville et al.

U.S. Appl. No. 10/483,252, filed Jan. 12, 2004, Chauville et al.

U.S. Appl. No. 10/483,322, filed Jan. 12, 2004, Liege et al.

U.S. Appl. No. 10/483,495, filed Jan. 12, 2004, Chanas et al.

U.S. Appl. No. 10/483,496, filed Jan. 12, 2004, Chanas et al.

U.S. Appl. No. 10/483,494, filed Jan. 12, 2004, Liege et al.

U.S. Appl. No. 10/483,497, filed Jan. 12, 2004, Liege et al.

* cited by examiner

FIG_2

FIG_6

METHOD AND SYSTEM FOR PRODUCING FORMATTED DATA RELATED TO DEFECTS OF AT LEAST AN APPLIANCE OF A SET, IN PARTICULAR, RELATED TO BLURRING

FIELD OF THE INVENTION

The present invention relates to a method and a system for producing formatted information related to the defects of at least one appliance of a chain.

SUMMARY OF THE INVENTION

The invention relates to a method for producing formatted information related to the appliances of an appliance chain. The appliance chain includes in particular at least one image-capture appliance and/or at least one image-restitution appliance. The method includes the stage of producing formatted information related to the defects of at least one appliance of the chain.

Preferably, according to the invention, the appliance is capable of capturing or restituting an image (I). The appliance is provided with at least one fixed characteristic and/or one variable characteristic depending on the image (I). The fixed characteristics and/or variable characteristics can be associated with one or more values of characteristics, especially the focal length and/or the focusing and their values of associated characteristics. The method includes the stage of producing, from a measured field D(H), measured formatted information related to the defects of the appliance. The formatted information may include the measured formatted information.

Extended Formatted Information and Deviation

Preferably, according to the invention, the method additionally includes the stage of producing extended formatted information related to the defects of the appliance from measured formatted information. The formatted information can include the extended formatted information. The extended formatted information exhibits a deviation compared with the said measured formatted information.

Concept of Model-Interpolation-Choice of a Threshold and Choice of the Simplest Model for Arriving at the Threshold Preferably, according to the invention, the method is such that the formatted information produced from the measured formatted information is represented by the parameters of a parameterizable model chosen from among a set of parameterizable models, especially a set of polynomials. The method additionally includes the stage of selecting the parameterizable model within the set of parameterizable models by:
  defining a maximum deviation,
  ordering the parameterizable models of the set of parameterizable models in accordance with their degree of complexity of employment,
  choosing the first of the parameterizable models of the ordered set of parameterizable models in such a way that the deviation is smaller than the maximum deviation.

According to an alternative embodiment of the invention, the extended formatted information may be composed of the measured formatted information.

Preferably, according to the invention, the method includes a calculation algorithm (AC) with which the measured field D(H) can be obtained from a universal set (M). The calculation algorithm (AC) includes the following stages:
  the stage of capturing or of restituting the universal set (M) by means of the appliance to produce an image (I),
  the stage of choosing at least one image zone (ZI) in the image (I),
  the stage of calculating a reference image (R) from the image (I),
  the stage of determining, within the reference image (R), a reference zone (ZR) homologous to the image zone (ZI),
  the stage of choosing a base (B) with which all or part of the image zone (ZI) can be represented by an image representation (RI) and all or part of the reference zone (ZR) can be represented by a reference representation (RR),
  the stage of selecting zero or one or more variable characteristics, referred to hereinafter as selected variable characteristics, among the set of variable characteristics.

The measured field D(H) is composed of the set of three-membered groups comprising:
  an image zone (ZI) and/or an identifier of the image zone (ZI),
  the image representation (RI) of the image zone (ZI),
  the reference representation (RR) of the reference zone (ZR).

The measured field D(H) is additionally composed of the value, for the image (I), of each of the selected variable characteristics. It results from the combination of technical features that a measured field characterizing a defect is obtained. This defect is referred to as blurring within the meaning of the present invention.

Preferably, according to the invention, the reference image (R) contains reference pixels. The reference pixels each have a reference pixel value. The method is such that, to calculate the reference image (R) from the image (I), the image (I) is subsampled, especially to obtain a reference image (R) whose reference pixels can take one or the other of two reference pixel values.

It results from the combination of technical features that the reference image (R) exhibits the same defects as the image (I), with the exclusion of blurring.

Preferably, according to the invention, the method is such that a base (B) is chosen to permit a representation in frequency, and is calculated in particular by means of a Fourier transform.

Preferably, according to the invention, the method is such that a base (B) is chosen to permit a representation in wavelets or in wavelet packets.

Preferably, according to the invention, the method is such that there is chosen a linear base containing a small number of elements. It results therefrom that a representation is obtained to a good approximation with a simple calculation.

Preferably, according to the invention, the reference representation (RR) is composed of digital values. The method additionally includes the stage of choosing the universal set (M) in such a way that the percentage of digital values below a first specified threshold is below a second predetermined threshold, especially 1%.

Preferably, according to the invention, the universal set (M) is composed of elements whose distribution in size and whose geometric position extend over a broad spectrum.

According to the invention, the universal set (M) can be chosen in such a way that the representation of the image (I) in the base (B) is substantially independent, except for the defects, of the conditions of capture or restitution of the image (I); in the case of an image-capture appliance in particular, the representation is independent of the orientation and of the position of the universal set (M) relative to the image-capture appliance.

According to the invention, the universal set (M) is constructed from a quantized image of a natural scene.

According to the invention, the method additionally includes the stage of preprocessing the image (I) by means of a calculation that eliminates part of the defects.

The blurring within the meaning of the present invention characterizes the appliance and the calculating means with which the defects can be removed.

Interpolation to Format an Arbitrary Point

Preferably, according to the invention, the method additionally includes the stage of obtaining extended formatted information related to an arbitrary image zone (ZIQ), by deducing the formatted information related to an arbitrary image zone (ZIQ) from measured formatted information.

Variable Focal Length

Preferably, according to the invention, the method is such that the appliance of the appliance chain is provided with at least one variable characteristic depending on the image, especially the focal length and/or the aperture. Each variable characteristic is capable of being associated with a value to form a combination composed of the set of variable characteristics and values. The method additionally includes the following stages:

the stage of selecting predetermined combinations, the stage of calculating measured formatted information, especially by employing the calculation algorithm (AC) for each of the predetermined combinations selected in this way.

Variable Focal Length-Formatting in an Arbitrary Zone

According to the invention, an argument is defined as an arbitrary image zone and one of the combinations. The method additionally includes the stage of deducing, from measured formatted information, the extended formatted information related to an arbitrary argument.

It results from the combination of technical features that the formatted information is more compact and resistant to measurement errors.

Choice of a Threshold for the Deviation-Formatting According to This Threshold

Preferably, according to the invention, the method is such that, in order to deduce the extended formatted information from measured formatted information:

a first threshold is defined the extended formatted information is selected in such a way that the deviation is below the first threshold.

Addition of the Deviations to the Formatted Information

Preferably, according to the invention, the method additionally includes the stage of associating the deviations with the formatted information. It results from the combination of technical features that the formatted information can be used by software for processing images captured by the appliance in order to obtain images whose residual defects are known. It results from the combination of technical features that the formatted information can be used by image-processing software to obtain images intended to be restituted by an image-restitution appliance with known residual defects.

Case of the Color Image

Preferably, according to the invention, in the case in which the image is a color image composed of a plurality of color planes, the method additionally includes the stage of producing the measured formatted information by employing the calculation algorithm (AC) for at least two of the color planes.

System

The invention relates to a system for producing formatted information related to the appliances of an appliance chain. The appliance chain includes in particular at least one image-capture appliance and/or at least one image-restitution appliance. The system includes calculating means for producing formatted information related to the defects of at least one appliance of the chain.

Preferably, according to the invention, the appliance is capable of capturing or restituting an image (I). The appliance contains at least one fixed characteristic and/or one variable characteristic depending on the image (I). The fixed characteristic and/or variable characteristic can be associated with one or more values of characteristics, especially the focal length and/or the focusing and their values of associated characteristics. The system includes calculating means for producing, from a measured field D(H), measured formatted information related to the defects of the appliance. The formatted information may include the measured formatted information.

Extended Formatted Information and Deviation

Preferably, according to the invention, the system additionally includes calculating means for producing extended formatted information related to the defects of the appliance from measured formatted information. The formatted information can include the extended formatted information. The extended formatted information exhibits a deviation compared with the said measured formatted information.

Concept of Model-Interpolation-Choice of a Threshold and Choice of the Simplest Model for Arriving at the Threshold Preferably, according to the invention, the system is such that the formatted information produced from the measured formatted information is represented by the parameters of a parameterizable model chosen from among a set of parameterizable models, especially a set of polynomials. The system additionally includes selection means for selecting the parameterizable model within the set of parameterizable models by:

defining a maximum deviation, ordering the parameterizable models of the set of parameterizable models in accordance with their degree of complexity of employment, choosing the first of the parameterizable models of the ordered set of parameterizable models in such a way that the deviation is smaller than the maximum deviation.

Preferably, according to the invention, the system includes calculating means that employ a calculation algorithm (AC) with which the measured field D(H) can be obtained from a universal set (M). The image-capture or image-restitution appliance includes means for capturing or restituting the universal set (M), so that an image (I) can be produced. The calculating means include data-processing means for:

choosing at least one image zone (ZI) in the image (I), calculating a reference image (R) from the image (I), determining, within the reference image (R), a reference zone (ZR) homologous to the image zone (ZI), choosing a base (B) with which all or part of the image zone (ZI) can be represented by an image representation (RI) and all or part of the reference zone (ZR) can be represented by a reference representation (RR), selecting zero or one or more variable characteristics, referred to hereinafter as selected variable characteristics, among the set of variable characteristics.

The measured field D(H) is composed of the set of three-membered groups comprising:

an image zone (ZI) and/or an identifier of the image zone (ZI), the image representation (RI) of the image zone (ZI), the reference representation (RR) of the reference zone (ZR).

The measured field D(H) is additionally composed of the value, for the image (I), of each of the selected variable characteristics, in such a way that there is obtained a measured field characterizing a defect referred to as blurring within the meaning of the present invention.

Preferably, according to the invention, the reference image (R) contains reference pixels. The reference pixels each have a reference pixel value. The system is such that the processing means for calculating the reference image (R) from the image (I) include means for subsampling the image (I), especially for obtaining a reference image (R) whose reference pixels can take one or the other of two reference pixel values.

Preferably, according to the invention, the system is such that the data-processing means make it possible to choose a base (B) that permits a representation in frequency, and that is calculated in particular by means of a Fourier transform.

Preferably, according to the invention, the system is such that the data-processing means make it possible to chose a base (B) that permits a representation in wavelets or in wavelet packets.

Preferably, according to the invention, the system is such that the data-processing means make it possible to choose a linear base containing a small number of elements.

Preferably, according to the invention, the reference representation (RR) is composed of digital values. The system includes data-processing means with which it is possible to choose the universal set (M) in such a way that the percentage of digital values below a first specified threshold is below a second predetermined threshold, especially 1%.

Preferably, according to the invention, the universal set (M) is composed of elements whose distribution in size and whose geometric position extend over a broad spectrum.

Preferably, according to the invention, the universal set (M) is chosen in such a way that the representation of the image (I) in the base (B) is substantially independent, except for the defects, of the conditions of capture or restitution of the image (I); in the case of an image-capture appliance in particular, the representation is independent of the orientation and of the position of the universal set (M) relative to the image-capture appliance.

Preferably, according to the invention, the universal set (M) is constructed from a quantized image of a natural scene.

Preferably, according to the invention, the system additionally makes it possible to preprocess the image (I) by employing calculating means to eliminate part of the defects.

Interpolation to Format an Arbitrary Point

Preferably, according to the invention, the system additionally includes data-processing means with which it is possible to obtain extended formatted information related to an arbitrary image zone (ZIQ), by deducing the formatted information related to an arbitrary image zone (ZIQ) from measured formatted information.

Variable Focal Length

Preferably, according to the invention, the system is such that the appliance of the appliance chain is provided with at least one variable characteristic depending on the image, especially the focal length and/or the aperture. Each variable characteristic is capable of being associated with a value to form a combination composed of the set of variable characteristics and values. The system additionally includes calculating means for calculating measured formatted information, especially by employing the calculation algorithm (AC) for selected predetermined combinations.

Variable Focal Length-Formatting in an Arbitrary Zone

Preferably, according to the invention, the system additionally includes data-processing means for deducing, from measured formatted information, the extended formatted information related to an arbitrary argument. An argument is defined as an arbitrary image zone and one of the combinations.

Choice of a Threshold for the Deviation-Formatting According to This Threshold

Preferably, according to the invention, the system is such that the data-processing means for deducing the extended formatted information from measured formatted information include selection means for selecting the extended formatted information in such a way that the deviation is below a first threshold.

Addition of the Deviations to the Formatted Information

Preferably, according to the invention, the system additionally includes data-processing means for associating the deviations with the said formatted information.

Case of the Color Image

Preferably, according to the invention, the image is a color image composed of a plurality of color planes. The system additionally includes calculating means for producing the measured formatted information by employing the calculation algorithm (AC) for at least two of the color planes.

BRIEF DESCRIPTION OF THE DRAWINGS

Other characteristics and advantages of the invention will become apparent upon reading of the description of alternative embodiments of the invention, provided by way of indicative and non-limitative examples, and of:

FIG. 1, which illustrates an example of employment of the method of the invention, FIG. 2, which illustrates an example of construction of a measured field D(H), FIG. 3a, which illustrates an example of a brightness line derived from universal set M, FIG. 3b, which illustrates an example of a brightness line generated in image I, FIG. 3c, which illustrates an example of a brightness line on reference image R, FIG. 4a, which illustrates a practical example of a reference representation RR, FIG. 4b, which illustrates a practical example of a reference representation RR that is adapted to universal set M, FIG. 4c, which illustrates a practical example of a reference representation RR that is not adapted to universal set M, FIG. 5a, which illustrates an example of subdivision of reference image R into reference zones ZR, FIG. 5b, which illustrates an example of measured formatted information related to an appliance having variable characteristics, FIG. 5c, which illustrates an example of the system for generating formatted information.

DETAILED DESCRIPTION OF THE EXEMPLARY EMBODIMENTS

Figure 6:
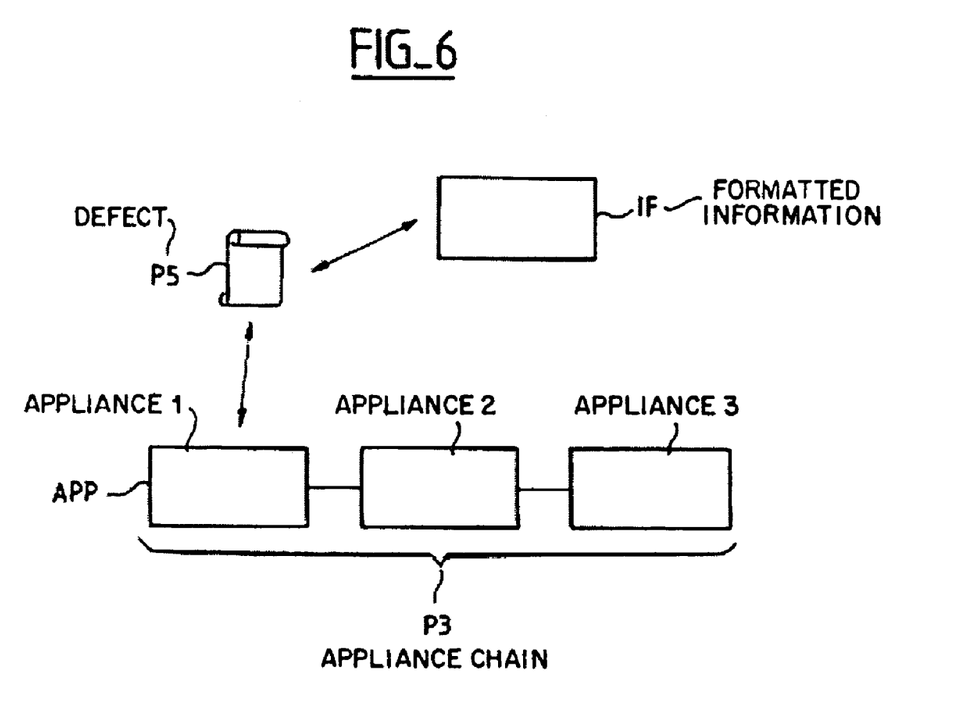
FIG. 6: formatted information IF related to the defects P5 of an appliance APP of an appliance chain P3.

Referring in particular to FIG. 6, a description will be given of the concept of appliance APP. Within the meaning of the invention, an appliance APP may be in particular:

- an image-capture appliance, such as a disposable photo appliance, a digital photo appliance, a reflex appliance, a scanner, a fax machine, an endoscope, a camcorder, a surveillance camera, a game, a camera integrated into or connected to a telephone, to a personal digital assistant or to a computer, a thermal camera or an echographic appliance,
- an image-restitution appliance, such as a screen, a projector, a television set, virtual-reality goggles or a printer,
- a human being having vision defects, such as astigmatism,
- an appliance which it is hoped can be emulated, to produce images having, for example, an appearance similar to those produced by an appliance of the Leica brand,
- an image-processing device, such as zoom software, which has the edge effect of adding blurring,
- a virtual appliance equivalent to a plurality of appliances APP.

A more complex appliance APP, such as a scanner/fax/printer, a photo-printing Minilab, or a videoconferencing appliance can be regarded as an appliance APP or as a plurality of appliances APP.

Appliance Chain

Referring in particular to FIG. 6, a description will now be given of the concept of appliance chain P3. An appliance chain P3 is defined as a set of appliances APP. The concept of appliance chain P3 may also include a concept of order.

The following examples constitute appliance chains P3:
- a single appliance APP,
- an image-capture appliance and an image-restitution appliance,
- a photo appliance, a scanner or a printer, for example in a photo-printing Minilab,
- a digital photo appliance or a printer, for example in a photo-printing Minilab,
- a scanner, a screen or a printer, for example in a computer,
- a screen or projector, and the eye of a human being,
- one appliance and another appliance which it is hoped can be emulated,
- a photo appliance and a scanner,
- an image-capture appliance and image-processing software,
- image-processing software and an image-restitution appliance,
- a combination of the preceding examples,
- another set of appliances P25.

Defect

Referring in particular to FIG. 6, a description will now be given of the concept of defect P5. A defect P5 of appliance APP is defined as a defect related to the characteristics of the optical system and/or of the sensor and/or of the electronic unit and/or of the software integrated in an appliance APP; examples of defects P5 include distortion, blurring, vignetting, chromatic aberrations, flash uniformity, sensor noise, grain, astigmatism and spherical aberration.

Image

Figure 1:
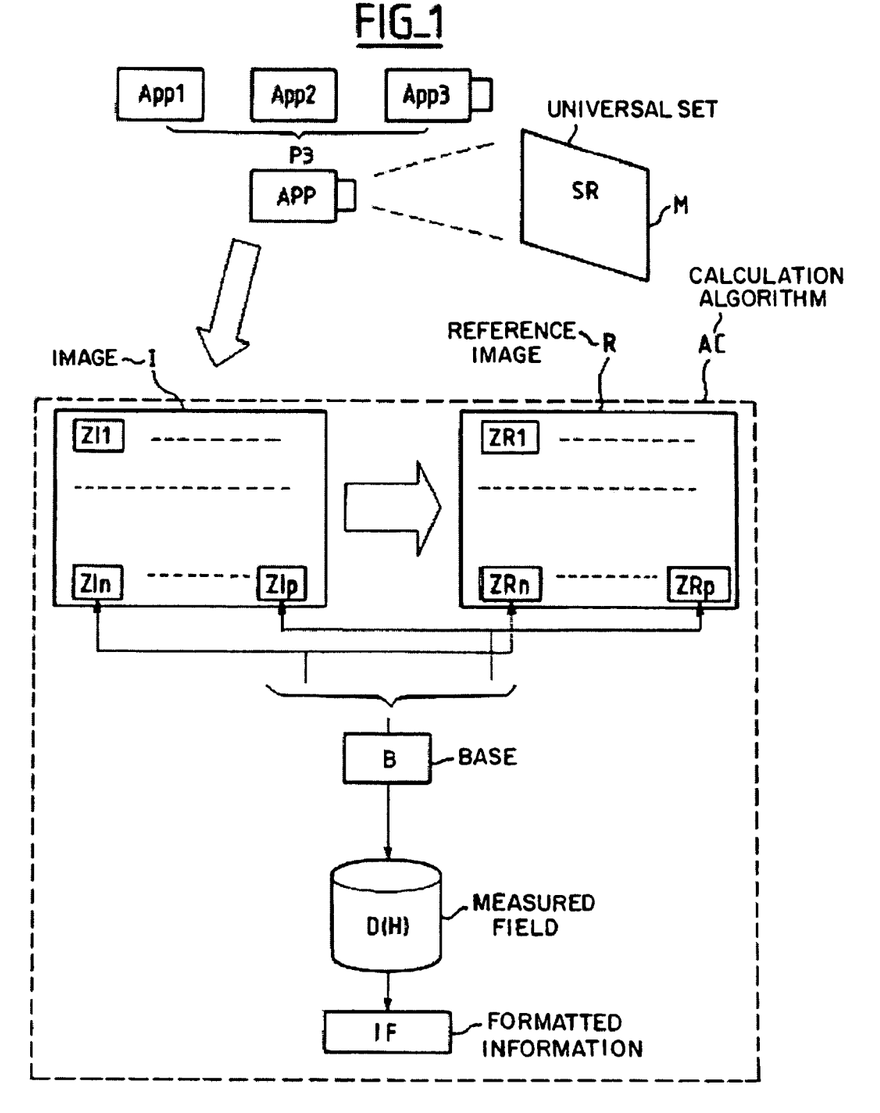

Referring in particular to FIGS. 1, and 6, a description will now be given of the concept of image I. Image I is defined as an image captured or modified or restituted by an appliance APP. Image I may originate from an appliance APP of appliance chain P3. Image I may be addressed to an appliance APP of appliance chain P3. More generally, image I may be derived from or addressed to appliance chain P3. In the case of animated images, such as video images, composed of a time sequence of fixed images, image I is defined as one fixed image of the sequence of images.

Formatted Information

Referring in particular to FIG. 6, a description will now be given of the concept of formatted information IF. Formatted information IF is defined as data related to the defects P5 of one or more appliances APP of appliance chain P3 and permitting calculation of a transformed image I-transf by taking the defects P5 of appliance APP into account. To produce the formatted information IF, there can be used various methods based on measurements and/or capture or restitution of references and/or simulations To produce the formatted information IF, it is possible, for example, to use the method described in the International Patent Application filed on the same day as the present application in the name of Vision IQ and entitled "Method and system for providing formatted information in a standard format to image-processing means". That application describes a method for providing formatted information IF in a standard format to image-processing means, especially software and/or components. The formatted information IF is related to the defects of an appliance chain P3. The appliance chain P3 includes in particular at least one image-capture appliance and/or one image-restitution appliance. The image-processing means use the formatted information IF to modify the quality of at least one image derived from or addressed to the appliance chain P3. The formatted information IF includes data characterizing the defects P5 of the image-capture appliance, especially the distortion characteristics, and/or data characterizing the defects of the image-restitution appliance, especially the distortion characteristics.

The method includes the stage of filling in at least one field of the standard format with the formatted information IF. The field is designated by a field name. The field contains at least one field value.

To search for the formatted information IF, it is possible, for example, to use the method described in the International Patent Application filed on the same day as the present application in the name of Vision IQ and entitled "Method and system for modifying the quality of at least one image derived from or addressed to an appliance chain". That application describes a method for modifying the quality of at least one image derived from or addressed to a specified appliance chain. The specified appliance chain is composed of at least one image-capture appliance and/or at least one image-restitution appliance. The image-capture appliances and/or the image-restitution appliances being progressively introduced on the market by separate economic players belong to an indeterminate set of appliances. The appliances of the set of appliances exhibit defects that can be characterized by formatted information. For the image in question, the method includes the following stages:

- the stage of compiling directories of the sources of formatted information related to the appliances of the set of appliances,
- the stage of automatically searching for specific formatted information related to the specified appliance chain among the formatted information compiled in this way,
- the stage of automatically modifying the image by means of image-processing software and/or image-processing components, while taking into account the specific formatted information obtained in this way.

To produce the formatted information IF, it is possible, for example, to use the method described in the International Patent Application filed on the same day as the present application in the name of Vision IQ and entitled "Method and system for reducing update frequency of image-processing means". That application describes a method for reducing the update frequency of image-processing means, in particular software and/or a component. The image-processing means make it possible to modify the quality of the digital images derived from or addressed to an appliance chain. The appliance chain is composed in particular of at least one image-capture appliance and/or at least one image-restitution appliance. Image-processing means employ formatted information related to the defects of at least one appliance of the appliance chain. The formatted information depends on at least one variable. The formatted information makes it possible to establish a correspondence between one part of the variables and of the identifiers. By means of the identifiers it is possible to determine the value of the variable corresponding to the identifier by taking the identifier and the image into account. It results from the combination of technical features that it is possible to determine the value of a variable, especially in the case in which the physical significance and/or the content of the variable are known only after distribution of image-processing means. It also results from the combination of technical features that the time between two updates of the correction software can be spaced apart. It also results from the combination of technical features that the various economic players that produce appliances and/or image-processing means can update their products independently of other economic players, even if the latter radically change the characteristics of their product or are unable to force their client to update their products. It also results from the combination of technical features that a new functionality can be deployed progressively by starting with a limited number of economic players and pioneer users.

To exploit the formatted information IF, it is possible, for example, to use the method and the system described in the International Patent Application filed on the same day as the present application in the name of Vision IQ and entitled "Method and system for modifying a digital image, taking into account its noise". That application describes a method for calculating a transformed image from a digital image and formatted information IF related to the defects P5 of an appliance chain P3. Appliance chain P3 includes image-capture appliances and/or image-restitution appliances. Appliance chain P3 contains at least one appliance APP. The method includes the stage of automatically determining the characteristic data from the formatted information IF and/or the digital image. It results from the combination of technical features that the transformed image does not exhibit any visible or annoying defect, especially defects related to noise, as regards its subsequent use.

Variable Characteristic

A description will now be given of the concept of variable characteristic CC. According to the invention, a variable characteristic CC is defined as a measurable factor, which is variable from one image I to another that has been captured, modified or restituted by the same appliance APP, and which has an influence on defect P5 of the image that has been captured, modified or restituted by appliance APP, especially:

- a global variable, which is fixed for a given image I, an example being a characteristic of appliance APP at the moment of capture or restitution of the image, related to an adjustment of the user or related to an automatic function of appliance APP,
- a local variable, which is variable within a given image I, an example being coordinates x, y or rho, theta in the image, making it possible to apply, if need be, local processing that differs depending on the zone of image I.

A measurable factor which is variable from one appliance APP to another but which is fixed from one image I to another that has been captured, modified or restituted by the same appliance APP is not generally considered to be a variable characteristic CC. An example is the focal length for an appliance APP with fixed focal length.

The formatted information IF may depend on at least one variable characteristic CC.

By variable characteristic CC there can be understood in particular:
- the focal length of the optical system,
- the redimensioning applied to the image (digital zoom factor: enlargement of part of the image; and/or undersampling: reduction of the number of pixels of the image),
- the nonlinear brightness correction, such as the gamma correction,
- the enhancement of contour, such as the level of deblurring applied by appliance APP,
- the noise of the sensor and of the electronic unit,
- the aperture of the optical system,
- the focusing distance,
- the number of the frame on a film,
- the underexposure or overexposure,
- the sensitivity of the film or sensor,
- the type of paper used in a printer,
- the position of the center of the sensor in the image,
- the rotation of the image relative to the sensor,
- the position of a projector relative to the screen,
- the white balance used,
- the activation of a flash and/or its power,
- the exposure time,
- the sensor gain,
- the compression,
- the contrast,
- another adjustment applied by the user of appliance APP, such as a mode of operation,
- another automatic adjustment of appliance APP,
- another measurement performed by appliance APP.

Variable Characteristic Value

A description will now be given of the concept of variable characteristic value VCV. A variable characteristic value VCV is defined as the value of variable characteristic CC at the moment of capture, modification or restitution of a specified image I.

General Description of the Method

FIG. 1 illustrates a system according to the invention, the said system being provided with a calculation algorithm AC with which a measured field D(H) can be produced and employing:
- a universal set M, which may be a reference scene (SR), an image I,
- a reference image R calculated from image I.

According to a practical example of the system of the invention employing the method of the invention, there is provided a stage of construction of image I by means of appliance APP or of the appliance chain, which may include image-capture appliances as illustrated in FIG. 1, or it may also include image-restitution appliances such as in a projection system. In the case of an image-capture system, image I may be produced by a sensor (such as a CCD) or, in the case of an image-restitution system, image I may be that displayed on a projection screen or that, for example, reproduced on a paper sheet of a printer.

Image I is obtained from universal set M by means of an appliance APP or of an appliance chain. An appliance chain is a set of appliances with which an image can be obtained. For example, an appliance chain App1/App2/App3 will be able to include an image-capture appliance, a scanner, a printing appliance, etc. Image I therefore contains defects, in particular distortion, vignetting, chromatic aberrations, blurring, etc., related to these appliances.

It is possible but not necessary to choose variable characteristics CC of the appliance APP (or of the appliance chain) among those used to obtain image I with appliance APP. The variable characteristics of an appliance or of an appliance chain can include the focal length of the optical system of an appliance, the focusing, the aperture, the white balance, the number of the photo in a set of photos, the digital zoom, and the characteristics of partial capture of an image ("crop" in English terminology), etc.

According to one embodiment of the invention, it is possible but not necessary to know a certain number of variable characteristic values VCV of the image at the moment of filming, in such a way that the knowledge of these values fixes the variable characteristics and reduces to processing the case of an image I derived from an appliance that is not provided with variable characteristics.

As shown in FIG. 1, image I can be subdivided into a sum of image zones ZI, of arbitrary shape and not necessarily contiguous. For example, it will be possible for an image zone ZI to be a rectangular window.

Reference image R is deduced from image I and must be regarded as perfect or quasi-perfect. Later on we shall see a practical example of reference image R. A reference zone ZR homologous to an image zone ZI will be defined as a zone, within reference image R, having the same shape and same placement as the image zone ZI with which it is associated, in such a way that, for example, if zone ZI is a rectangular window of 100×100 pixels, then the corresponding zone ZR in the reference image will be composed of 100×100 pixels and will be situated at the same place.

From the viewpoint of design of the system, images I and R are digital and are registered in known manner in memory, where they are processed.

Construction of a Measured Field D(H)

According to one practical example of the system and/or of the method of the invention, it is provided that a base B is chosen for representation of an image zone ZI and of its homologous reference zone ZR.

The choice of base B will be implicit or else will be established within the formatted information. Within the meaning of the present invention, the person skilled in the art sees that it is possible to represent a digital image (such as I) in a vector space of dimension equal to the number of pixels. By base B there is understood, non-exclusively, a base, in the mathematical sense of the term, of this vector space and/or a vector subspace thereof.

Hereinafter, frequency is defined as an identifier related to each element of the base. The person skilled in the art understands Fourier transformations and/or wavelet transforms as changes of the base of the image space. In the case of an appliance APP for which the blurring defects significantly affect only a subspace of the vector space of the images, it will be necessary to correct only those components of image I that belong to this subspace. Thus base B will be chosen preferably as a base for representation of this subspace.

Another way of employing the method within the meaning of the invention is to choose, for representation of the image, a base that is optimal within the meaning, for example, of that of calculation time. It will be possible to choose this base with small dimension, each element of the base having a support of a few pixels spatially localized in image I (for example, splines or sets of Laplace operators of local variations, Laplacian of Laplacian, or derivatives of higher order, etc.).

The appliance induces blurring in image I. The transformation between the "ideal blurring-free" image and the blurred image I is achieved by a blurring operator. The person skilled in the art knows that one way to choose a blurring operator is in particular to take a linear operator, or in other words a convolution. Since image I is spatially defined on a finite image space (fixed number of pixels), the linear operator can be represented in matrix form. Deblurring is equivalent to inverting the operator and therefore, in this case, to inverting the matrix. It is then possible to choose the base B that makes the matrix almost diagonal, or else to choose a subbase that retains the axes containing the most significant information.

The choice of this representation base B is made in such a way as to obtain information, related to image I and to reference image R, which is compact and expressed in a representation space suitable for observation and modeling of the defect or defects being analyzed.

Figure 2:
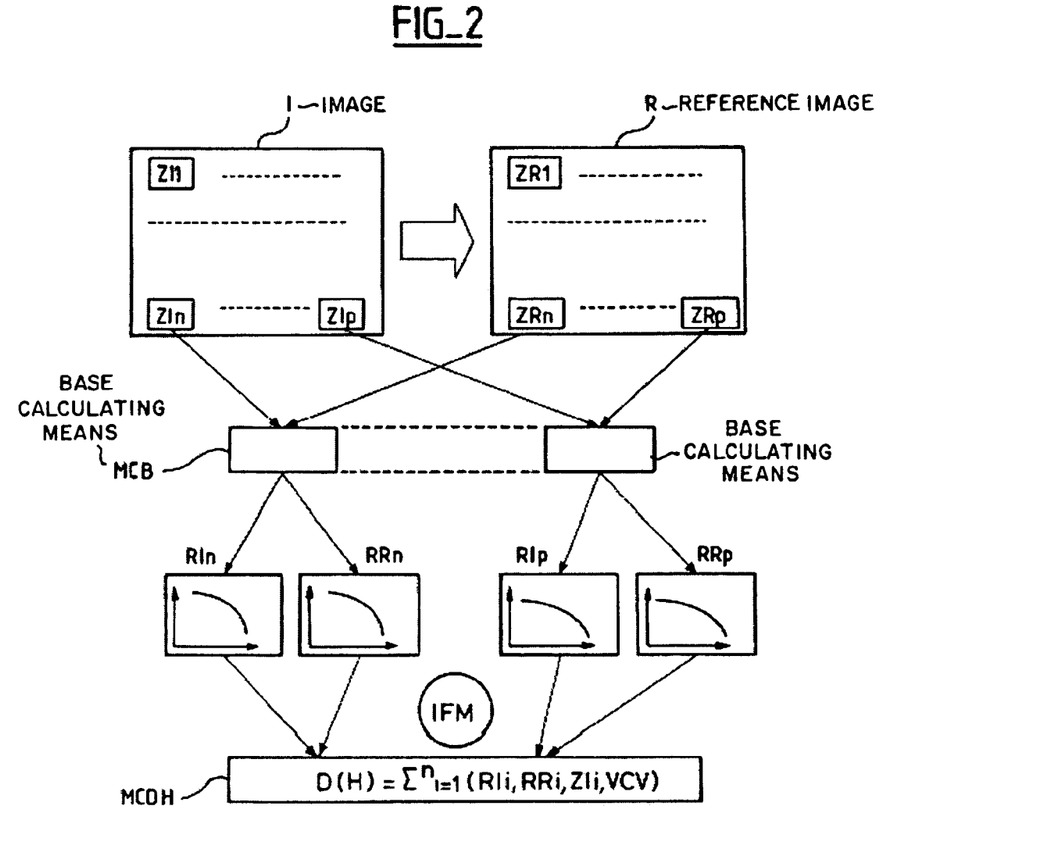

In a practical example of the method described in FIG. 2, we have chosen to transform, by using calculating means MCB, the image zones ZI and reference zones ZR in base B by a Fourier transform, and to extract respectively an image representation RI and a reference representation RR, which can be calculated, for example, from the modulus of the Fourier transform of image zone ZI and homologous reference zone ZR respectively. A simple way of representing RI and/or RR in data-processing configuration is to use a normalized vector formalism in which each component of the vector is characteristic of a frequency of the signal contained in ZI and/or ZR (for example: first component characterizing the low frequencies, and last component characterizing the high frequencies), and each component value is characteristic of the energy of the signal at the frequency in question.

This process of calculation of the image representation RI and reference representation RR is iterated for all the image zones ZI of image I. Calculating means MCDH then provides the measured field D(H). Each element of measured field D(H) is then composed of a three-membered group formed by:

an image zone ZI and/or an identifier of the said image zone (for example, the coordinates of the rectangle characterizing ZI),
image representation RI related to the said image zone ZI,
reference representation RR related to reference zone ZR, which is homologous to the said image zone ZI.

Measured field D(H) may additionally include the value or values for the said image I of the set of variable characteristic values VCV of the acquisition and/or restitution device at the moment of creation of image I, in such a way that there is obtained a measured field that characterizes a defect referred to as blurring within the meaning of the present invention.

Measured formatted information IFM related to the blurring defect is defined as any combination constructed from an element of D(H) and/or from variable characteristic values VCV and/or from image or reference zones and/or from the choice of base B.

A feasible example of measured formatted information is to take (image zone ZI, reference zone ZR, base B and variable characteristic values VCV) or else (image zone ZI, image representation RI, reference representation RR and variable characteristic values VCV) or any other combination.

Creation of Reference R

We have seen in the foregoing description that the calculation of reference image R is performed on the basis of image I. Reference image R contains reference pixels, and each reference pixel possesses a reference pixel value, which will be calculated from brightness values of I by means of subsampling. By subsampling within the meaning of the present invention there is understood spatial subsampling either in the number of pixel values (quantization) or in the number of elements of the base, etc., in such a way that reference image R, with the exception of blurring, possesses the same defects derived from the acquisition and/or restitution system as does image I.

Universal set M must possess the characteristics necessary for characterization of the blurring introduced by the acquisition and/or restitution appliances. For example, universal set M must be chosen in such a way as:

to contain elements whose distribution in size and whose geometry extend over a broad spectrum or, in other words, in such a way as to contain a signal whose representation in base B, especially of frequency type, must exhibit dense information for the set of frequencies that it is appropriate to analyze. The dense character of the information can be expressed, for example, by the fact that the representation of log(amplitude) as a function of log(frequency), the logarithm of the frequency, is almost a straight line,
to exhibit independence as to its representation in base B for changing filming conditions (change of framing, rotation, change of illumination, etc.),
to exhibit brightness which is quantized, by binary values, for example, at each of its points, in which case the universal set is composed of black and white points.

A simple way of constructing a universal set M is to use the quantized image of a natural scene that possesses the properties evoked hereinabove. Universal set M may then be a binarized photograph of a natural scene.

The capture or restitution of universal set M may also be replaced by a simulation of the appliance or a bench measurement to produce image I, in such a way that the field of application of the method also covers metrological applications.

The method then includes the stage of capturing and/or restituting universal set M on the basis of appliance APP in order to produce image I. Image I therefore contains a certain number of defects, especially blurring, derived from appliance APP. The blurring effect is characterized in image I by, in particular:

the fact that, in the example in question, the brightness information in image I is not binary, whereas it was binary in universal set M,
the fact that a certain number of details of universal set M no longer exists in image I.

According to a method specific to the invention, it is possible to calculate a reference image R from 1 by idealizing image I in such a way that the initial quantization of universal set M is taken into account. In the case in which M is binary, reference image R may be calculated from quantization of image I on one bit (binary). R then represents the ideal and therefore blurring-free image, which could have been obtained from universal set M, with the exclusion of details that were not rendered in image I.

In fact, there exists a certain number of details that, because of blurring, have disappeared between universal set M and image I, either because they were destroyed by the blurring or because the blurring reduced them to a level below or equal to the noise in image I. In view of the goal of removing the blurring of image I, it is a vain hope to recover these details. A practical example of the method according to the present invention permits us to generate a reference image R that corresponds to image I and is free of blurring, in the sense of the information that image I has actually perceived. It is to be noted that reference image R and universal set M do not contain the same levels of details, in the sense that the details not perceived in I actually will not exist in reference image R. This method will make it possible to provide formatted information related to blurring, so that the details that have not been lost can be deblurred without necessarily attempting to recreate all of the details of M. In fact, such an attempt may add artifacts into the deblurred image.

Figure 3:
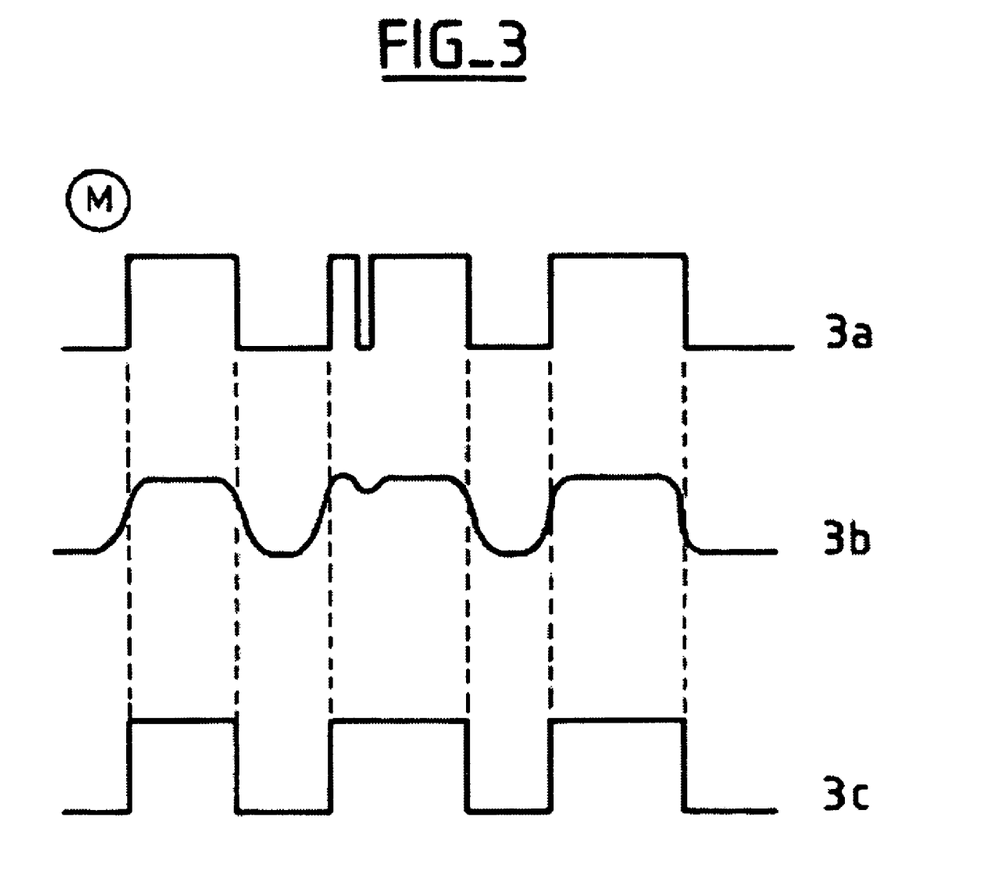

FIG. 3 illustrates:

in line 3a, the brightness signal of a line of universal set M, in line 3b, the same signal captured by appliance APP and obtained in image I, in line 3c, the reference signal obtained from the signal of line 3b.

As is obvious in FIG. 3, the square-wave signals of line 3a are deformed in line 3b, then regain an ideal shape in line 3c, while excluding details DET that were not perceived by I.

Quantization of reference image R (in one or more bits depending on the representations of universal set M) may be accomplished, for example globally over image I, locally over analysis zones, by integrating statistical information on the brightness of image I in order to optimize the estimate of the signal-to-noise ratio and to quantize the signal as 1 and noise as 0.

Figure 4A:
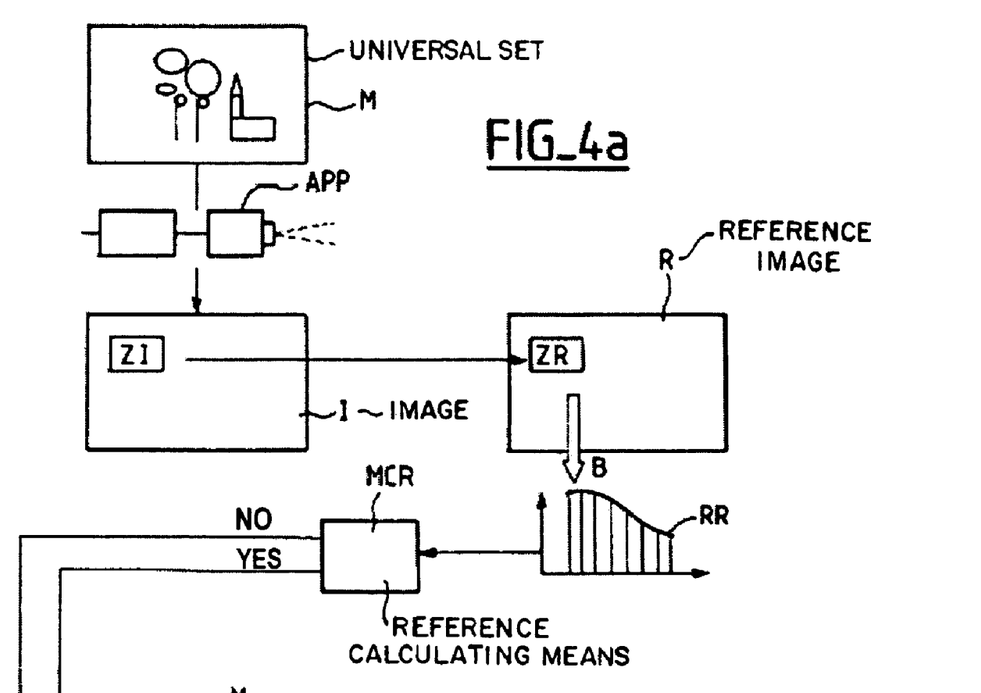

FIG. 4a shows calculating means MCR employing a second practical example of reference image R on the basis of a universal set M. In FIG. 4a, universal set M is captured by appliance APP to produce image I. An image zone ZI is selected and a transformation on ZI is calculated to create homologous reference zone ZR. Reference representation RR of reference zone ZR in base B must be such that, if universal set M is correctly chosen, the percentage of digital values below a specified first threshold will be lower than a second predetermined threshold, especially 1%. The first threshold may be related to the noise of the appliance, while the second threshold makes it possible, in the case of a frequency representation, for example, to cover almost the entire range of frequencies transmitted by appliance APP and/or by the appliance chain. It is calculation means MCR that make this selection possible.

Figure 4B:
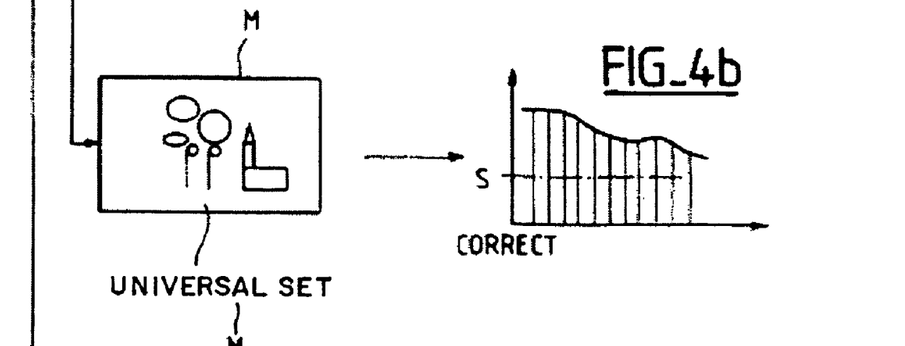
Figure 4C:
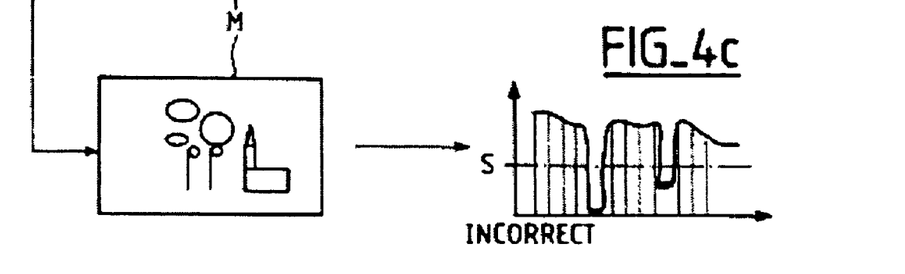

For the example illustrated in FIGS. 4b,c, this means that no more than 1% of the signal is permitted to be below threshold S. FIG. 4c is characteristic of the inability of universal set M to generate measurable information at frequencies having energy below threshold S. FIG. 4b, in turn, shows a universal set M adapted to the characteristics of appliance APP.

We have written hereinabove that image I, derived from appliance APP and representing universal set M, incorporated within itself all the defects of the appliance and/or of the appliance chain. According to the method of the invention, it is possible additionally to undertake one or more stages of preprocessing of image I (such as compensation for distortion, vignetting, chromatic aberration, gamma, streaks, etc.), in such a way that there remains in I only the blurring defect, which then becomes characteristic of appliance APP and of the preprocessing algorithms.

Extended Formatted Information, Concept of Deviation

We have seen that the measured field D(H) related to image I is composed of a set of items IFM1 . . . IFm of measured formatted information. An item of measured formatted information related to an image zone ZI includes, for example:

image zone ZI or an identifier of the zone, image representation RI, reference representation RR, the variable characteristic values selected for image I.

The use of the system will lead to the need to process a large number of image zones and thus a large volume of information. To make operation of the system more flexible, to accelerate processing and/or to be resistant to measurement errors, the invention provides for deducing, from items of measured formatted information IFM1 to IFMm, items of extended formatted information IFE1 to IFEm belonging to a surface or a hypersurface SP that can be represented by a function chosen within a space of limited dimension, such as a polynomial of limited order chosen among the class of polynomials of finite degree, or a spline function of appropriate degree or any other interpolation function.

Figure 5A:
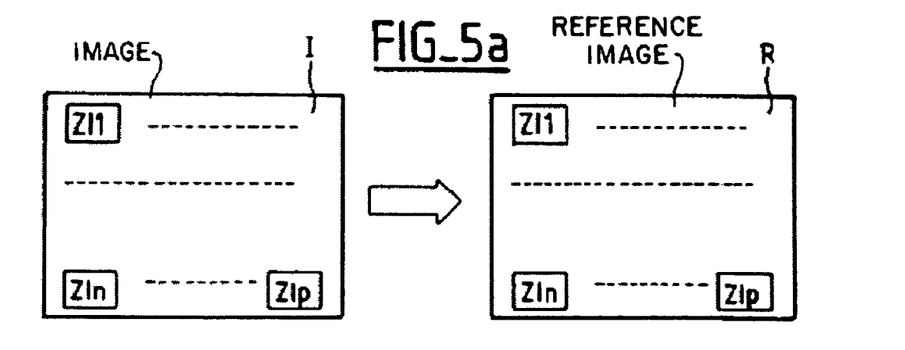
Figure 5B:
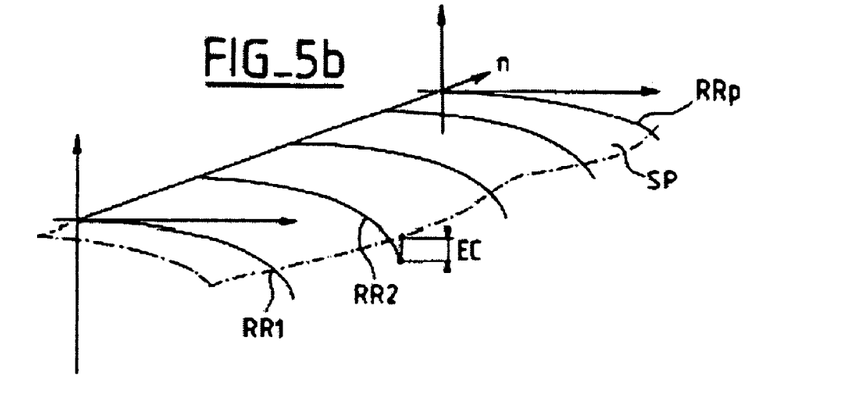

FIG. 5 illustrates an extremely simplified example corresponding to a case in which the measured formatted information IFM is composed solely of reference representations RR: RR1 . . . RRp. FIG. 5b illustrates, among other features, the entire reference representation RR for the p reference zones ZR analyzed on image R of FIG. 5a.

The method of the invention comprises calculating a parameterizable model such as a polynomial surface SP. A particular way of calculating SP may be to calculate this surface by passing through or by passing in proximity to all of the measured formatted information. In FIG. 5b, surface SP passes through or in proximity to all representations RR1 . . . RRm in such a way that:

the parameterization of surface SP is additionally much more compact in memory space than the set of reference representations RR, surface SP makes it possible to obtain measurements that are more resistant to noise, surface SP makes it possible, as the case may be, to interpolate reference profiles RR1 on zones that do not correspond to measurement zones.

Under these conditions, the system will be able to use a parameterizable model during processing of an image, instead of resorting to a large volume of measured formatted information.

The difficulty lies in finding a surface SP that passes through all of the points or in proximity to all of these points. The assumption is provided that a deviation EC could exist between an item of measured formatted information IFM and an item of extended formatted information IFE similar to IFM but extracted from SP. In addition, it is decided that such an EC must not exceed a certain threshold dS. Under these conditions it will be appropriate to make a polynomial surface pass through all of the points of the measured formatted information IFM±dS.

The choice of this threshold will be made appropriately with the filming errors, the measurement errors, the level of precision required for the correction, etc. The method employed will be able to provide for the use of a specified number of parameterizable models that can be written, if possible for example, in the form of polynomials. It is provided that these models are classified in order of increasing complexity.

Thereafter, given possession of a set of measured information, each model is tested by starting preferably from the simplest model (the polynomial of lowest order), until there is obtained a model that defines, at the intersection of the polynomial surface and the direction of each item of measured formatted information, an item of extended formatted information whose deviation EC compared with the item of measured formatted information is below the threshold dS.

The method illustrated schematically by FIGS. 5a and 5b is designed to obtain extended formatted information. However, the method of the invention could be limited to using only the measured formatted information as formatted information. It is also possible to provide for the use, as formatted information, of the measured formatted information and the extended formatted information.

Regardless of the case, it is also possible to provide for associating, with the formatted information, the deviations EC found between measured formatted information and extended formatted information. In this way the formatted information can be used by image-processing software to obtain images whose residual is known, whether it be for images captured by an image-capture appliance or for images restituted by an image-restitution appliance.

Figure 5C:
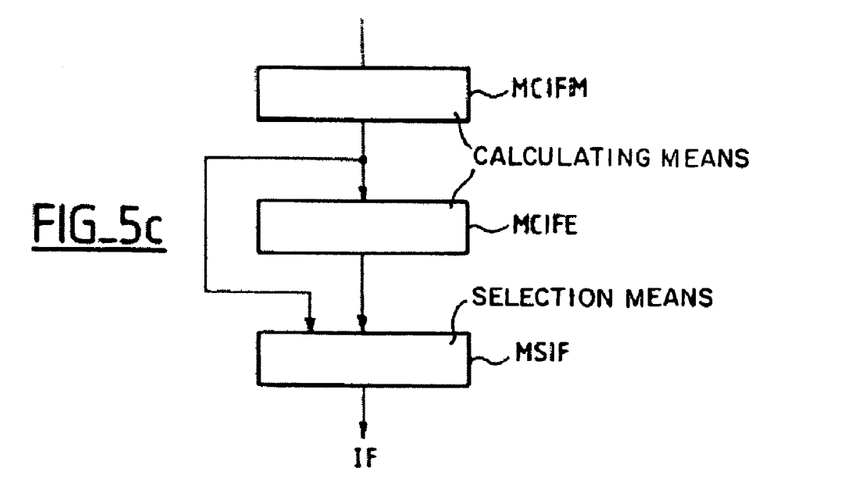

The system illustrated in FIG. 5c will include calculating means MCIFM, calculating means MCIFE and selection means MSIF.

Arbitrary Image Zone ZIQ

The method according to the invention makes it possible, by the use of a parameterizable model such as polynomial surface SP, to determine extended formatted information for arbitrary image zones ZIQ. Nevertheless, by undertaking simple interpolations (linear, bilinear), for example, between the items of measured formatted information, it is possible to extract such extended formatted information for arbitrary image zones ZIQ without resorting to parameterizable models SP.

Variable Characteristics of the Appliance Chain

In the foregoing, it has been seen that formatted information could contain variable characteristics. In the case of a limited number of variable characteristics or of a single variable characteristic provided with a given quantization (such as 3 values of focal length for a photographic appliance), one employment of the method of the invention is to iterate the process described hereinabove n times.

In fact, for practical purposes, the said information will be able to contain a combination of variable characteristics, such as a combination of focal length, focusing, diaphragm aperture, capture speed, aperture, etc. It is difficult to imagine how the formatted information related to different combinations can be calculated, all the more so because certain characteristics of the combination, especially such as the focal length and focusing distance, can vary continuously. One way of analyzing the influencing parameters in order to determine the choice of pertinent combinations may be to undertake an analysis into principal components, a technique known to the person skilled in the art.

The method of the invention provides for calculating the formatted information from measured formatted information by interpolation for known combinations of variable characteristics. The use of a parameterizable model such as a polynomial surface SP will necessitate introduction, into its control arguments, of measured formatted information and variable characteristic values VCV related to the measurement performed. By analogy with the foregoing, there will exist a deviation EC between the measured formatted information and the extended formatted information derived from the parameterizable model. This deviation EC must not exceed a certain threshold dS and, under these conditions, it will be appropriate to make a polynomial surface SP pass through all of the points of the measured formatted information IFM±dS. The choice of this threshold will be made appropriately with the filming errors, the measurement errors, the level of precision required for the correction, etc.

The invention employed will be able to provide for the use of a specified number of parameterizable models that can be written, if possible for example, in the form of polynomials. It is provided that these models are classified in order of increasing complexity.

Thereafter, given possession of a set of measured information, each model is tested by starting preferably from the simplest model (the polynomial of lowest order), until there is obtained a model that defines, at the intersection of the polynomial surface and the direction of each item of measured formatted information, an item of extended formatted information whose deviation EC compared with the item of measured formatted information is below the threshold dS.

The method provides, as the case may be, including the deviation EC in the formatted information, in such a way that this information can be used if necessary by image-processing software.

Color Image

The method according to the invention makes it possible to calculate formatted information related to a color image. A color image can be regarded as being composed of a plurality of monochromatic planes. Traditionally, it can be considered that a color image is a trichromatic image composed of three monochromatic images, of red, green, blue or similar wavelength. In the case of certain sensors it may also be composed of four planes: cyan, magenta, yellow, black. Calculation algorithm AC can then be employed on at least two of the color planes. An example of construction of formatted information comprises employing calculation algorithm AC for each color plane, in such a way that it is possible to use the formatted information and/or the extended formatted information and/or the measured formatted information to correct the monochromatic and polychromatic blurring, within the meaning of the present invention, of appliance APP and/or of the chain of capture and/or restitution appliances. It will be noted that it is possible, according to one way of employing the method of the invention, to use the same reference image R for each of the planes of the color image.

The method according to the invention makes it possible to calculate formatted information related to a monochromatic and/or a polychromatic image in such a way that the said formatted information and/or the said measured formatted information can be used by software for processing images captured by a first image-capture appliance, in order to obtain images whose quality, in terms of defects, is comparable to that of a second image-capture appliance. For example, it is possible to generate images having an antiquated appearance (retro look).

Likewise, according to another employment of the method of the invention, the formatted information and/or the said measured formatted information can be used by software for processing images to be restituted by the first restitution appliance, in order to obtain images whose quality, in terms of defects, is comparable to that restituted by the said second restitution appliance.

APPLICATION OF THE INVENTION TO COST REDUCTION

Cost reduction is defined as a method and system for lowering the cost of an appliance APP or of an appliance chain P3, especially the cost of the optical system of an appliance or of an appliance chain, the method consisting in:
  reducing the number of lenses, and/or
  simplifying the shape of the lenses, and/or
  designing an optical system having defects P5 that are larger than those desired for the appliance or the appliance chain, or choosing the same from a catalog, and/or
  using materials, components, processing operations or manufacturing methods that are less costly for the appliance or the appliance chain and that add defects P5.

The method and system according to the invention can be used to lower the cost of an appliance or of an appliance chain: it is possible to design a digital optical system, to produce formatted information IF related to the defects of the appliance or of the appliance chain, to use this formatted information to enable image-processing means, whether they are integrated or not, to modify the quality of images derived from or addressed to the appliance or to the appliance chain, in such a way that the combination of the appliance or the appliance chain with the image-processing means is capable of capturing, modifying or restituting images of the desired quality at reduced cost.

The invention claimed is:

1. A method for producing formatted information related to appliances of an appliance chain, the appliance chain including at least one image-capture appliance and/or at least one image-restitution appliance, the method comprising:
  producing formatted information related to defects of at least one appliance of the appliance chain,
  wherein said at least one appliance of the appliance chain is configured to capture or restitute an image and is provided with at least one fixed characteristic or one variable characteristic depending on the image, the fixed characteristic or the variable characteristic associated with one or more values of characteristics, said values including characteristics of a focal length or focusing of said at least one appliance, and
  wherein said producing formatted information produces from a measured field measured formatted information related to the defects of said at least one appliance of the appliance chain, said measured field including at least one of the following,
    at least one of an image zone and an identifier of the image zone,
    an image representation of the image zone, and
    an reference representation of an reference zone;
  the measured field further including, for the image, at least one of said values of the variable characteristics.

2. A method according to claim 1, further comprising:
  producing extended formatted information related to the defects of the at least one appliance from the measured formatted information, the extended formatted information exhibiting a deviation compared with the measured formatted information.

3. A method according to claim 2, wherein in the method the measured formatted information is represented by parameters of a parameterizable model chosen from among a set of parameterizable models, the method further comprising:
  selecting the parameterizable model within the set of parameterizable models by:
    defining a maximum deviation,
    ordering the parameterizable models of the set of parameterizable models in accordance with their degree of complexity of employment,
    choosing a first of the parameterizable models of the ordered set of parameterizable models such that the deviation is smaller than the maximum deviation.

4. A method according to claim 2, wherein the extended formatted information is the measured formatted information.

5. A method according to claim 2, the method including a calculation algorithm with which the measured field can be obtained from a universal set, the calculation algorithm including:
  capturing or restituting the universal set by the at least one appliance to produce the image,
  choosing at least one image zone in the image,
  calculating a reference image from the image,
  determining, within the reference image, a reference zone homologous to the image zone,
  choosing a base with which all or part of the image zone can be represented by an image representation and all or part of the reference zone can be represented by a reference representation, and
  selecting zero or one or more variable characteristics as the selected variable characteristics, among the set of the variable characteristics,
  the measured field further including respective values, for the image, of each of the selected variable characteristics; such that a defect-characterizing measured field characterizing a defect as blurring is obtained.

6. A method according to claim 5, wherein the reference image contains reference pixels, the reference pixels each having a reference pixel value, the method being such that, to calculate the reference image from the image, the image is subsampled, to obtain a reference image whose reference pixels can take one or the other of two reference pixel values;
  wherein the reference image exhibits the same defects as the image, with exclusion of blurring.

7. A method according to claim 5, wherein in the method the base is chosen to permit a representation in frequency, and is calculated by a Fourier transform.

8. A method according to claim 5, wherein in the method the base is chosen to permit a representation in wavelets or in wavelet packets.

9. A method according to claim 5, wherein in the method a linear base containing a small number of elements is chosen.

10. A method according to claim 5, wherein the reference representation includes digital values, the method further comprising:
  choosing the universal set such that the percentage of digital values below a first specified threshold is below a second predetermined threshold.

11. A method according to claim 5, wherein the universal set includes elements whose distribution in size and whose geometric position extend over a broad spectrum.

12. A method according to claim 5, wherein the universal set is chosen such that the representation of the image in the base is substantially independent, except for the defects, of conditions of capture or restitution of the image, in a case of an image-capture appliance, the representation is independent of orientation and of a position of the universal set relative to the image-capture appliance.

13. A method according to claim 5, wherein the universal set is constructed from a quantized image of a natural scene.

14. A method according to claim 5, the method further comprising preprocessing the image by a calculation that eliminates part of the defects;
such that blurring characterizes the appliance and the calculating means with which the defects can be removed.

15. A method according to claim 5, the method further comprising obtaining the extended formatted information related to an arbitrary image zone, by deducing the formatted information related to an arbitrary image zone from the measured formatted information.

16. A method according to claim 2, wherein in the method the appliance of the appliance chain is provided with at least one variable characteristic depending on the image, each variable characteristic configured to be associated with a value to form a combination including the set of the variable characteristics and of the values;
the method further comprising:
selecting predetermined combinations,
calculating measured formatted information, by employing the calculation algorithm for each of the selected predetermined combinations.

17. A method according to claim 16, wherein an argument is defined as an arbitrary image zone and one of the combinations, the method further comprising:
deducing, from the measured formatted information, the extended formatted information related to an arbitrary argument.

18. A method according to claim 15, wherein in the method, to deduce the extended formatted information from the measured formatted information:
a first threshold is defined,
the extended formatted information is selected such that the deviation is below the first threshold.

19. A method according to claim 2, the method further comprising:
associating the deviations with the formatted information.

20. A method according to claim 5, wherein the image is a color image including a plurality of color planes, the method further comprising:
producing the measured formatted information by employing the calculation algorithm for at least two of the color planes.

21. A system for producing formatted information related to appliances of an appliance chain, the appliance chain including at least one image-capture appliance and/or at least one image-restitution appliance, the system comprising:
calculating means for producing formatted information related to the defects of at least one appliance of the appliance chain,
wherein said at least one appliance of the appliance chain is configured to capture or restitute an image and is provided with at least one fixed characteristic or one variable characteristic depending on the image, the fixed characteristic or the variable characteristic associated with one or more values of characteristics, said values including characteristics of a focal length or focusing of said at least one appliance, and
wherein said calculating means for producing formatted information produces from a measured field measured formatted information related to the defects of said at least one appliance of the appliance chain, said measured field including at least one of the following,
at least one of an image zone and an identifier of the image zone,
an image representation of the image zone, and
an reference representation of an reference zone;
the measured field further including, for the image, at least one of said values of the variable characteristics.

22. A system according to claim 21, further comprising:
calculating means for producing extended formatted information related to the defects of the appliance from the measured formatted information, the formatted information configured to include the extended formatted information, the extended formatted information exhibiting a deviation compared with the measured formatted information.

23. A system according to claim 22, wherein in the system the formatted information produced from the measured formatted information is represented by parameters of a parameterizable model chosen from among a set of parameterizable models; the system further comprising:
selection means for selecting the parameterizable model within the set of parameterizable models by:
defining a maximum deviation,
ordering the parameterizable models of the set of parameterizable models in accordance with their degree of complexity of employment,
choosing the first of the parameterizable models of the ordered set of parameterizable models such that the deviation is smaller than the maximum deviation.

24. A system according to claim 22, wherein the extended formatted information is the measured formatted information.

25. A system according to claim 22, the system including calculating means that employ a calculation algorithm with which the measured field can be obtained from a universal set, the image-capture or image-restitution appliance including means for capturing or restituting the universal set, so that an image can be produced;
the calculating means of the calculation algorithm including data-processing means for:
choosing at least one image zone in the image,
calculating a reference image from the image,
determining, within the reference image, a reference zone homologous to the image zone,
choosing a base with which all or part of the image zone can be represented by an image representation and all or part of the reference zone can be represented by a reference representation,
selecting zero or one or more variable characteristics, as selected variable characteristics, among the set of the variable characteristics,
the measured field further including respective values, for the image, of each of the selected variable characteristics; such that a defect-characterizing measured field characterizing a defect as blurring is obtained.

26. A system according to claim 25, wherein the reference image contains reference pixels, the reference pixels each having a reference pixel value, the system being such that the processing means for calculating the reference image from the image includes means for subsampling the image, for obtaining a reference image whose reference pixels can take one or the other of two reference pixel values.

27. A system according to claim 25, wherein in the system the data-processing means chooses therefrom the base that permits a representation in frequency, and is calculated by a Fourier transform.

28. A system according to claim 25, wherein in the system the data-processing means chooses therefrom the base that permits a representation in wavelets or in wavelet packets.

29. A system according to claim 25, wherein in the system the data-processing means chooses a linear base containing a small number of elements.

30. A system according to claim 25, wherein the reference representation includes digital values, the system further comprising:
   data-processing means for choosing the universal set such that the percentage of digital values below a first specified threshold is below a second predetermined threshold of 1%.

31. A system according to claim 25, wherein the universal set includes elements whose distribution in size and whose geometric position extend over a broad spectrum.

32. A system according to claim 25, wherein the universal set is chosen such that the representation of the image in the base is substantially independent, except for the defects, of conditions of capture or restitution of the image, in the case of an image-capture appliance, the representation is independent of orientation and of position of the universal set relative to the image-capture appliance.

33. A system according to claim 25, wherein the universal set is constructed from a quantized image of a natural scene.

34. A system according to claim 25, wherein the system additionally makes it possible to preprocess the image by employing calculating means to eliminate part of the defects.

35. A system according to claim 25, wherein the system additionally includes data-processing means with which it is possible to obtain the extended formatted information related to an arbitrary image zone, by deducing the formatted information related to an arbitrary image zone from the measured formatted information.

36. A system according to claim 22, wherein in the system the appliance of the appliance chain is provided with at least one variable characteristic depending on the image, each variable characteristic configured to be associated with a value to form a combination including the set of the variable characteristics and of the values;
   the system further comprising:
   calculating means for calculating the measured formatted information, by employing the calculation algorithm for selected predetermined combinations.

37. A system according to claim 36, wherein an argument is defined as an arbitrary image zone and one of the combinations, the system further comprising:
   data-processing means for deducing, from the measured formatted information, the extended formatted information related to an arbitrary argument.

38. A system according to claim 35, wherein in the system the data-processing means for deducing the extended formatted information from the measured formatted information includes selection means for selecting the extended formatted information such that the deviation is below a first threshold.

39. A system according to claim 22, the system further comprising data-processing means for associating the deviations with the formatted information.

40. A system according to claim 25, wherein the image is a color image including a plurality of color planes, the system further comprising:
   calculating means for producing the measured formatted information by employing the calculation algorithm for at least two of the color planes.

41. A system for producing formatted information related to appliances of an appliance chain, the appliance chain including at least one image-capture appliance and/or at least one image-restitution appliance, the system comprising:
   a calculator configured to produce formatted information related to the defects of at least one appliance of the appliance chain,
   wherein said at least one appliance of the appliance chain is configured to capture or restitute an image and is provided with at least one fixed characteristic or one variable characteristic depending on the image, the fixed characteristic or the variable characteristic associated with one or more values of characteristics, said values including characteristics of a focal length or focusing of said at least one appliance, and
   wherein said calculator produces from a measured field measured formatted information related to the defects of said at least one appliance of the appliance chain, said measured field including at least one of the following,
      at least one of an image zone and an identifier of the image zone,
      an image representation of the image zone, and
      an reference representation of an reference zone;
   the measured field further including, for the image, at least one of said values of the variable characteristics.

* * * * *